US008446702B2

(12) United States Patent
Krauss et al.

(10) Patent No.: US 8,446,702 B2
(45) Date of Patent: May 21, 2013

(54) CIRCUIT BREAKER

(75) Inventors: Andreas Krauss, Berlin (DE);
Aron-Ernst Musiol, Mahlow (DE)

(73) Assignee: Siemens Aktiengesellschaft, Munich (DE)

( * ) Notice: Subject to any disclaimer, the term of this patent is extended or adjusted under 35 U.S.C. 154(b) by 373 days.

(21) Appl. No.: 12/874,353

(22) Filed: Sep. 2, 2010

(65) Prior Publication Data
US 2011/0058300 A1 Mar. 10, 2011

(30) Foreign Application Priority Data

Sep. 4, 2009 (DE) .................. 10 2009 040 692

(51) Int. Cl.
*H02H 7/00* (2006.01)
(52) U.S. Cl.
USPC .......................................... 361/115
(58) Field of Classification Search
USPC .......................................... 361/115
See application file for complete search history.

(56) References Cited

U.S. PATENT DOCUMENTS

| | | | | |
|---|---|---|---|---|
| 5,113,304 A * | 5/1992 | Ozaki et al. | ............ | 361/87 |
| 6,753,493 B2 * | 6/2004 | Rhein et al. | ............ | 218/120 |
| 6,794,596 B2 * | 9/2004 | Rhein et al. | ............ | 218/154 |
| 6,842,322 B2 | 1/2005 | Houbre | | |
| 2002/0191361 A1 | 12/2002 | Houbre | | |

FOREIGN PATENT DOCUMENTS

| | | |
|---|---|---|
| DE | 32 23 687 A1 | 1/1984 |
| DE | 197 21 591 A1 | 11/1998 |
| DE | 602 00 500 T2 | 8/2005 |
| EP | 0 179 262 A1 | 4/1986 |

* cited by examiner

*Primary Examiner* — Stephen W Jackson
(74) *Attorney, Agent, or Firm* — Harness, Dickey & Pierce, P.L.C.

(57) ABSTRACT

A switch is disclosed for power distribution, in particular a circuit breaker and compact switch, which automatically interrupts the electric currents flowing through the switch in a polyphase electrical power supply system when a tripping situation occurs. In at least one embodiment, the switch includes switching contacts which are provided for each phase and can be opened via a switching shaft; an electronic release which automatically initiates the opening of the switching contacts via the switching shaft; electrical power converters, which in each case take the electrical power which is required for the electrical power supply for the release from the currents for the individual phases; instrument transformers which convert the currents in each of the individual phases to a measurement signal; an electronic circuit, in particular in the form of a microprocessor, for assessment of the current values which correspond to the measurement signals, wherein the occurrence of the tripping situation is in each case identified on the basis of the assessment. In order to improve the functional reliability of the switch, in at least one embodiment it is proposed that the currents emitted from the power converters are additionally recorded and that the electronic circuit carries out a plausibility comparison on the basis of the recorded current of the power converters and of the instrument transformers, and generates a warning signal in the event of non-plausibility.

9 Claims, 2 Drawing Sheets

CIRCUIT BREAKER

PRIORITY STATEMENT

The present application hereby claims priority under 35 U.S.C. §119 on German patent application number DE 10 2009 040 692.1 filed Sep. 4, 2009, the entire contents of which are hereby incorporated herein by reference.

FIELD

At least one embodiment of the invention generally relates to a switch for power distribution.

BACKGROUND

Switches for power distribution, in particular for low voltages, are generally known as circuit breakers, compact switches, etc., and, in their function as protective switches, are used to automatically interrupt the currents flowing through the switch. The switch is generally designed for the three phases of a three-phase power supply system, where the current in the neutral phase (the neutral conductor) frequently also flows through the switch. During normal operation, the currents in each phase each flow via switching contacts which rest on one another and can be opened at the same time by way of a switching shaft in order to interrupt the currents.

The known switches furthermore have an electronic release (for example an overcurrent release), which ensures that the switching contacts open in predetermined (tripping) conditions (tripping situation: for example overcurrent). The electrical power for the release's own power supply is taken by way of electrical power converters (generally iron-core transformers) from the phase currents to be monitored, to be precise via the magnetic fields, based on the transformer principle. Current sensors in the form of instrument transformers are used to record the individual phase currents, that is to say for the actual current recording/measurement, and generally use an air-cored coil (Rogowski converter), converting the magnetic field of the associated phase conductor to a measurement signal which is proportional to the current differentiated with respect to time.

In order to assess the measurement signals, the release has an electronic circuit which is generally in the form of a microprocessor. The purpose of the release is to identify the occurrence of a tripping situation and to interrupt all the current flows by way of the switching shaft. Nowadays, so-called combination instrument transformers are generally used in switches, that is to say a power converter and an instrument transformer are provided for each phase to be monitored.

The known switches have the disadvantage that the instrument transformers may be defective, and a tripping situation is therefore not identified. This may be caused by wire fractures in the supply lines between the instrument transformer and the release, and by turns shorts in the coil windings. Turns shorts in particular do not at the same time lead to a total failure, but to incorrect measurement signals. In this case, it is relatively complex to test the switches during operation.

SUMMARY

In at least one embodiment of the invention, the functional reliability of the switch is improved.

At least one embodiment of the invention provides that the currents and/or voltages emitted from the power converters are additionally recorded and that the electronic circuit carries out a plausibility comparison on the basis of the recorded currents of the power converters and of the instrument transformers, and generates a warning or tripping signal in the event of non-plausibility. The solution therefore comprises the identification of faults in the combination instrument transformers by a cost-effective measurement, which can be carried out technically relatively easily, of the power converter currents and/or voltages and plausibility analyses in conjunction with the current values of the instrument transformers. The wiring between the combination instrument transformers and parts of the electronics of the electronic release is also included in this fault identification. The user is then informed, for example by initiating a warning signal.

Non-plausibility occurs in particular (in the case of a release without an external power supply, that is to say when no external electrical power is fed in (for example 24 V DC), the release is active and no current is measured by the power converters)
- if the instrument transformer in one phase indicates a current and no current and/or no voltage is recorded for the power converter in this phase,
- if the instrument transformer in one phase indicates no current but the power converter in this phase emits a current and/or a voltage, and/or
- if the release is supplied with current, that is to say is activated, and no current and/or no voltage is recorded at least for any phase for the power converter.

In the simplest case, the release emits a warning message to the user when the warning signal is present.

In particular for protection of the connected loads, the release can immediately interrupt the currents flowing through the switch when a warning signal is present.

BRIEF DESCRIPTION OF THE DRAWINGS

The invention will be described in more detail in the following text with reference to the drawings, in which.

DETAILED DESCRIPTION OF THE EXAMPLE EMBODIMENTS

Figure 1:
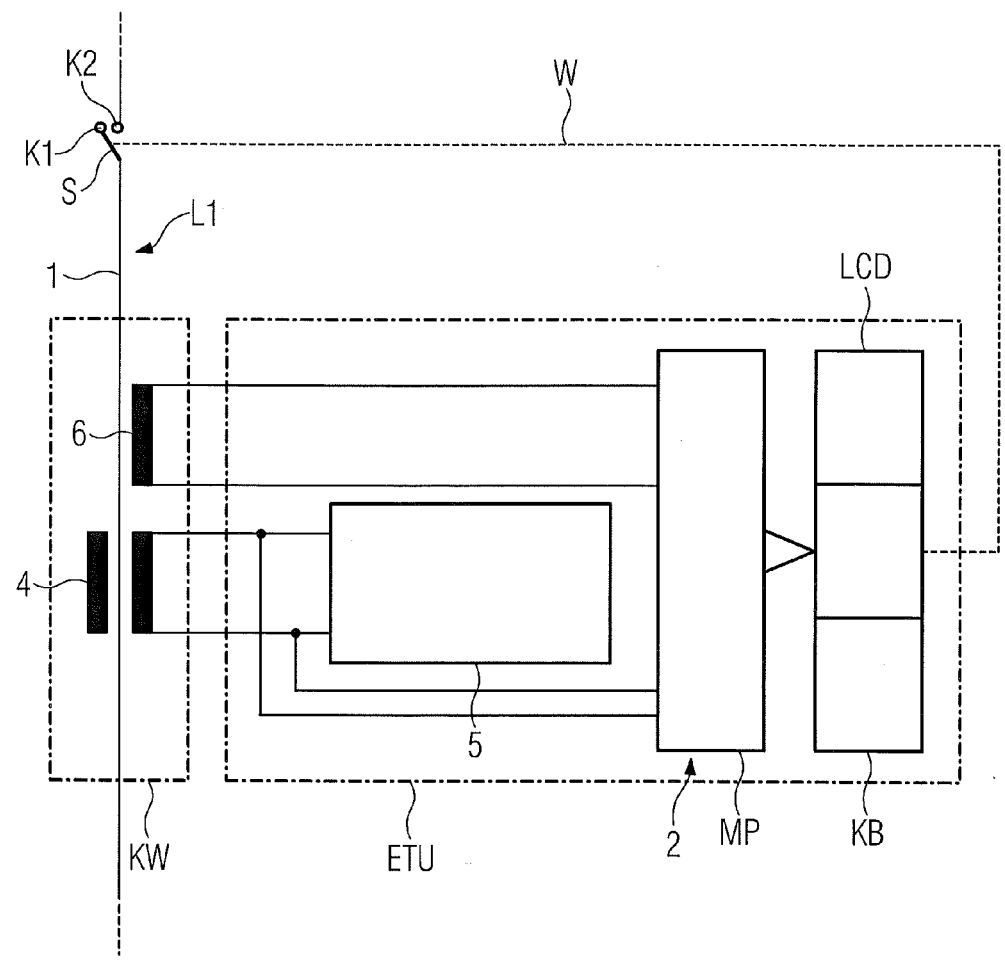
FIG. 1 shows a schematic illustration of a circuit breaker with a combination instrument transformer.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a switch S for power distribution in the form of a circuit breaker with switching contacts K1, K2, which is connected in a power line 1 (phase L1) of an electrical power supply system. The switch S is shown in the open state in FIG. 1, that is to say its switching contacts K1, K2 are disconnected from one another, and the current flow through the switch S is interrupted. The current through the power line L1 correspondingly flows through the switch S when the switch S is closed. The electrical power supply system is in this case a three-phase power supply system (three phases L), although only the phase L1 is illustrated in FIG. 1. In addition, the current in the neutral phase is also likewise passed through the switch S, via correspondingly provided switching contacts K1, K2. The switching contacts K1, K2 for all the phases can be opened by means of a joint switching shaft W, which is illustrated schematically in FIG. 1 by the dashed line. The switch includes a release ETU, which is in the form of an overcurrent release and whose electronic circuit 2 has a microprocessor MP, for example.

The circuit 2 is supplied with electrical power (power supply) via an electrical power converter 4, which outputs the current, like a transformer, from the line 1, which in this case acts as the primary coil. The coil in the power converter (iron-cored transformer) is connected to a power supply circuit 5 which produces a corresponding direct current from the power consumed.

The circuit 2 receives a measurement signal, which corresponds to the current in the phase L1, via an instrument transformer 6. The instrument transformer 6 is in the form of an air-cored coil (Rogowski converter) which produces a voltage as the measurement signal, which voltage is proportional to the current differentiated with respect to time. The circuit 2 is designed such that the current emitted from the power converter 4 (for example the current flowing in the electronic circuit 2) is likewise recorded. Alternatively, of course, it is also possible to determine the voltage of the power converter 4 at the input to the circuit 2.

In each case one power converter 4 and in each case one instrument transformer 6 are arranged—in the form of a combination instrument transformer KW—in a common housing for each phase to be monitored.

In a tripping situation, that is to say when the circuit 2 opens the switch S on the basis of predetermined current limit values or current profiles, this ensures an appropriate current through an electromagnet, which is not shown but itself operates the switching shaft W.

An indication LCD/LED indicates the desired switch information as required. Communication with other devices is possible via an appropriate bus KB.

On the basis of the current emitted from the power converter 4, the electronic circuit 2 carries out a plausibility comparison (self test) on the basis of the measurement signals from the instrument transformer 6 and the determined current and/or the determined voltage of the power converter 4. In the event of non-plausibility, an appropriate warning signal is generated, and/or the switch S is tripped.

Figure 2:
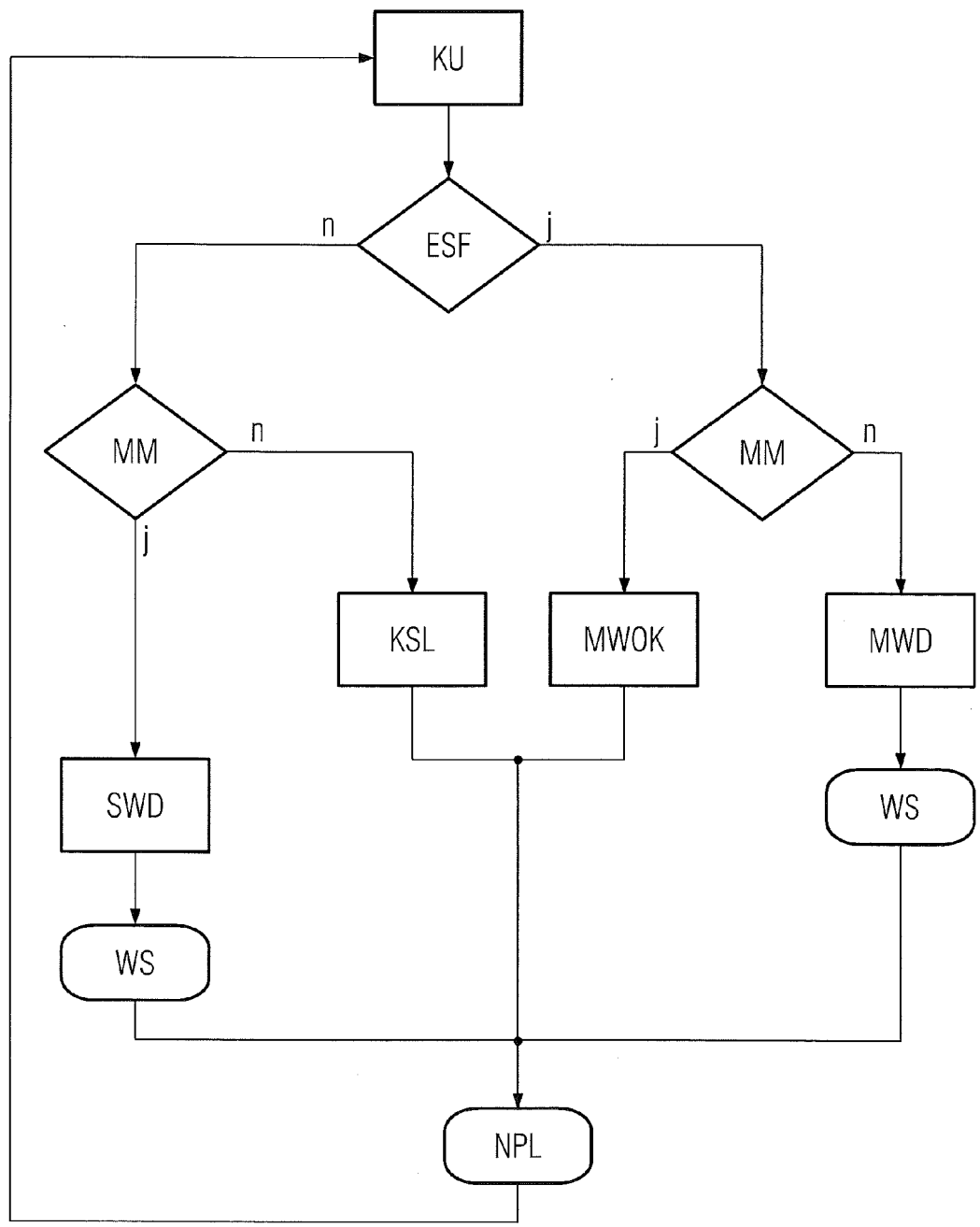
FIG. 2 shows a flowchart for the plausibility comparisons for the circuit breaker shown in FIG. 1.

FIG. 2 shows the flowchart of the plausibility comparison, by way of example for the phase L1, that is to say for one of the three phases L. The plausibility comparison is in this case carried out in a corresponding manner for all three phases L, including the neutral phase.

First of all, the electronic circuit 2 is activated, that is to say the microprocessor MP is switched on.

The currents in the power converter 4 and the signals from the instrument transformer 6 are then checked KU continuously. Each phase is in this case individually checked to determine whether a power current flow ESF is present. If yes, a check is carried out to determine whether a measured value is present from the instrument transformer 6 (check MM). If this is the case (path y), the combination instrument transformer KW (the instrument transformer 6 and/or the power converter 4) is serviceable, in terms of plausibility, and the next phase of the check is carried out. If no measured value is present, then the combination instrument transformer KW is defective from the plausibility point of view, and an appropriate warning or initiation signal WS is generated, which, for example, is indicated appropriately as a warning message on the indication LCD. The check is then repeated, that is to say it reverts to continuous checking KU.

If there is no power current flow ESF (path n), a check is carried out (check MM) to determine whether a measured value is present from the instrument transformer 6. If this is the case, then the power converter 4 or the instrument transformer 6 is defective (MWD), and an appropriate warning or initiation signal WS is also generated in this case. If the instrument transformer 6 likewise does not indicate any current flow (KSL), then the entire check is repeated (return to KU) (via NPL, that is to say for the next test step, that is to say for L2 after L1, etc.).

The warning or initiation signal WS may, of course, also initiate a more detailed check and/or a repair of the combination instrument transformer KW.

In this case, non-plausibility thus occurs in particular in the following three cases:
- if the instrument transformer 6 in one phase (for example L1) indicates a current and no current and/or no voltage is recorded for the power converter 4 in this phase,
- if the instrument transformer 6 in one phase (for example L1) indicates no current but the power converter 4 in this phase emits a current and/or a voltage, and/or
- if the release ETU is supplied with current, that is to say is activated, and no current and/or no voltage is recorded at least for one phase for the power converter 4.

The described plausibility comparison for the switch S makes it possible to automatically identify simple faults in a combination instrument transformer KW relatively cost-effectively and reliably during operation.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A switch for power distribution, which automatically interrupts electric currents flowing through the switch in a polyphase electrical power supply system when a tripping situation occurs, the switch comprising:
    switching contacts, provided for each phase of the polyphase electrical power supply system and openable via a switching shaft;
    an electronic release to automatically initiate opening of the switching contacts via the switching shaft;
    electrical power converters, each to take electrical power required for the electrical power supply for the release from currents for the phases;
    instrument transformers to convert the currents in each of the phases to a measurement signal; and
    an electronic circuit, for assessment of current values which correspond to the measurement signals, wherein an occurrence of a tripping situation is identified on the basis of each assessment, at least one of the currents and voltages emitted from the power converters being additionally recorded and wherein the electronic circuit is useable to carry out a plausibility comparison on the basis of the recorded at least one of currents and voltages of the power converters and of the instrument transformers, and generate a warning or tripping signal in the event of non-plausibility, wherein non-plausibility occurs at least one of:
    if the instrument transformer in one phase indicates a current and at least one of no current and no voltage is recorded for the power converter in the one phase, if the instrument transformer in one phase indicates no current but the power converter in the one phase emits at least one of a current and a voltage, and
    if the release is supplied with current and at least one of no current and no voltage is recorded at least for one phase for the power converter.

2. A switch for power distribution, which automatically interrupts electric currents flowing through the switch in a polyphase electrical power supply system when a tripping situation occurs, the switch comprising:
    switching contacts, provided for each phase of the polyphase electrical power supply system and openable via a switching shaft;
    an electronic release to automatically initiate opening of the switching contacts via the switching shaft;
    electrical power converters, each to take electrical power required for the electrical power supply for the release from currents for the phases;
    instrument transformers to convert the currents in each of the phases to a measurement signal; and
    an electronic circuit, for assessment of current values which correspond to the measurement signals, wherein an occurrence of a tripping situation is identified on the basis of each assessment, at least one of the currents and voltages emitted from the power converters being additionally recorded and wherein the electronic circuit is useable to carry out a plausibility comparison on the basis of the recorded at least one of currents and voltages of the power converters and of the instrument transformers, and generate a warning or tripping signal in the event of non-plausibility, wherein the release emits a warning message when a warning signal is present.

3. A switch for power distribution, which automatically interrupts electric currents flowing through the switch in a polyphase electrical power supply system when a tripping situation occurs, the switch comprising:
   switching contacts, provided for each phase of the polyphase electrical power supply system and openable via a switching shaft;
   an electronic release to automatically initiate opening of the switching contacts via the switching shaft;
   electrical power converters, each to take electrical power required for the electrical power supply for the release from currents for the phases;
   instrument transformers to convert the currents in each of the phases to a measurement signal; and
   an electronic circuit, for assessment of current values which correspond to the measurement signals, wherein an occurrence of a tripping situation is identified on the basis of each assessment, at least one of the currents and voltages emitted from the power converters being additionally recorded and wherein the electronic circuit is useable to carry out a plausibility comparison on the basis of the recorded at least one of currents and voltages of the power converters and of the instrument transformers, and generate a warning or tripping signal in the event of non-plausibility, wherein the release interrupts the currents flowing through the switch when a tripping signal is present.

4. A switch for power distribution, which automatically interrupts electric currents flowing through the switch in a polyphase electrical power supply system when a tripping situation occurs, the switch comprising:
   switching contacts, provided for each phase of the polyphase electrical power supply system and openable via a switching shaft;
   an electronic release to automatically initiate opening of the switching contacts via the switching shaft;
   electrical power converters, each to take electrical power required for the electrical power supply for the release from currents for the phases;
   instrument transformers to convert the currents in each of the phases to a measurement signal; and
   an electronic circuit, for assessment of current values which correspond to the measurement signals, wherein an occurrence of a tripping situation is identified on the basis of each assessment, at least one of the currents and voltages emitted from the power converters being additionally recorded and wherein the electronic circuit is useable to carry out a plausibility comparison on the basis of the recorded at least one of currents and voltages of the power converters and of the instrument transformers, and generate a warning or tripping signal in the event of non-plausibility, wherein the switch is a circuit breaker.

5. A switch for power distribution, which automatically interrupts electric currents flowing through the switch in a polyphase electrical power supply system when a tripping situation occurs, the switch comprising:
   switching contacts, provided for each phase of the polyphase electrical power supply system and openable via a switching shaft;
   an electronic release to automatically initiate opening of the switching contacts via the switching shaft;
   electrical power converters, each to take electrical power required for the electrical power supply for the release from currents for the phases;
   instrument transformers to convert the currents in each of the phases to a measurement signal; and
   an electronic circuit, for assessment of current values which correspond to the measurement signals, wherein an occurrence of a tripping situation is identified on the basis of each assessment, at least one of the currents and voltages emitted from the power converters being additionally recorded and wherein the electronic circuit is useable to carry out a plausibility comparison on the basis of the recorded at least one of currents and voltages of the power converters and of the instrument transformers, and generate a warning or tripping signal in the event of non-plausibility, wherein the electronic circuit is in the form of a microprocessor.

6. The switch as claimed in claim 2, wherein non-plausibility occurs at least one of:
   if the instrument transformer in one phase indicates a current and at least one of no current and no voltage is recorded for the power converter in the one phase, if the instrument transformer in one phase indicates no current but the power converter in the one phase emits at least one of a current and a voltage, and
   if the release is supplied with current and at least one of no current and no voltage is recorded at least for one phase for the power converter.

7. The switch as claimed in claim 3, wherein non-plausibility occurs at least one of:
   if the instrument transformer in one phase indicates a current and at least one of no current and no voltage is recorded for the power converter in the one phase, if the instrument transformer in one phase indicates no current but the power converter in the one phase emits at least one of a current and a voltage, and
   if the release is supplied with current and at least one of no current and no voltage is recorded at least for one phase for the power converter.

8. The switch as claimed in claim 4, wherein non-plausibility occurs at least one of:
   if the instrument transformer in one phase indicates a current and at least one of no current and no voltage is recorded for the power converter in the one phase, if the instrument transformer in one phase indicates no current but the power converter in the one phase emits at least one of a current and a voltage, and
   if the release is supplied with current and at least one of no current and no voltage is recorded at least for one phase for the power converter.

9. The switch as claimed in claim 5, wherein non-plausibility occurs at least one of:
   if the instrument transformer in one phase indicates a current and at least one of no current and no voltage is recorded for the power converter in the one phase, if the instrument transformer in one phase indicates no current but the power converter in the one phase emits at least one of a current and a voltage, and
   if the release is supplied with current and at least one of no current and no voltage is recorded at least for one phase for the power converter.

* * * * *